(12) United States Patent
Kang

(10) Patent No.: US 8,943,879 B2
(45) Date of Patent: Feb. 3, 2015

(54) APPARATUS FOR DETECTING STEERING TORQUE AND STEERING ANGLE AND STEERING SYSTEM HAVING THE SAME

(75) Inventor: Minchul Kang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 126 days.

(21) Appl. No.: 13/510,778

(22) PCT Filed: Nov. 19, 2010

(86) PCT No.: PCT/KR2010/008196
§ 371 (c)(1),
(2), (4) Date: May 18, 2012

(87) PCT Pub. No.: WO2011/062438
PCT Pub. Date: May 26, 2011

(65) Prior Publication Data
US 2012/0312088 A1 Dec. 13, 2012

(30) Foreign Application Priority Data

Nov. 20, 2009 (KR) .................. 10-2009-0112442

(51) Int. Cl.
*G01M 15/00* (2006.01)
*G01M 17/06* (2006.01)
(Continued)

(52) U.S. Cl.
CPC . *G01L 3/104* (2013.01); *B62D 6/10* (2013.01); *B62D 15/0215* (2013.01)
USPC ............... 73/117.02; 73/862.326; 73/862.334

(58) Field of Classification Search
CPC ....... G01L 3/104; B62D 15/0215; B62D 6/10
USPC ......................... 73/117.02, 862.01
See application file for complete search history.

(56) References Cited

U.S. PATENT DOCUMENTS 5,825,178 A   10/1998  Hipp et al.
6,513,396 B2 *  2/2003  Nakamura et al. ....... 73/862.335
(Continued)

FOREIGN PATENT DOCUMENTS

CN   10-1506620 A   8/2009
JP   2005-010015 A   1/2005
(Continued)

OTHER PUBLICATIONS

Author: Didier Angleviel, Didier Frachon and Gérald Masson, Title: Development of a Contactless Hall effect torque sensor for Electric Power Steering, Date: Dec. 23, 2005, Publisher: SAE International, Number of pp. 8.*

(Continued)

*Primary Examiner* — Lisa Caputo
*Assistant Examiner* — Roger Hernandez-Prewit
(74) *Attorney, Agent, or Firm* — Saliwanchik, Lloyd & Eisenschenk

(57) ABSTRACT

Disclosed herein are a steering torque and steering angle measurement apparatus, the present invention including a stator fixed to an output shaft, a magnet disposed at the inner part of the stator and being fixed to an input shaft, a torque sensor measuring a steering torque by sensing a magnetic field produced between the stator and the magnet, and a steering angle signal generation part measuring the steering angle by outputting an ON signal ordinary times and outputting an OFF signal at each preset rotation duration of the output shaft when the output shaft rotates, thereby reducing a component number, simplifying a manufacturing process and saving a cost price.

14 Claims, 4 Drawing Sheets

(51) Int. Cl.
*G01L 3/10* (2006.01)
*B62D 6/10* (2006.01)
*B62D 15/02* (2006.01)

(56) References Cited

U.S. PATENT DOCUMENTS

| | | | |
|---|---|---|---|
| 6,956,198 B2 * | 10/2005 | Alsobrooks et al. | 250/231.13 |
| 7,021,160 B2 * | 4/2006 | Pattok et al. | 73/862.332 |
| 7,028,545 B2 * | 4/2006 | Gandel et al. | 73/328 |
| 7,093,687 B2 | 8/2006 | Masaki et al. | |
| 7,639,004 B2 * | 12/2009 | Islam et al. | 324/207.25 |
| 7,725,227 B2 * | 5/2010 | Pattok et al. | 701/41 |
| 8,131,425 B2 * | 3/2012 | Muller et al. | 701/41 |
| 2003/0062890 A1 * | 4/2003 | Tokumoto | 324/207.25 |
| 2005/0173181 A1 | 8/2005 | Masaki et al. | |
| 2008/0007251 A1 | 1/2008 | Lee | |

FOREIGN PATENT DOCUMENTS

| | | | | |
|---|---|---|---|---|
| JP | 2005-201852 A | 7/2005 | | |
| JP | 2007-269281 A | 10/2007 | | |
| JP | 2009-192248 A | 8/2009 | | |
| KR | 10-2009-0097378 A | 9/2009 | | |
| KR | 20090097378 A * | 9/2009 | | B62D 6/10 |
| WO | WO 2009035266 A2 * | 3/2009 | | G01L 3/10 |

OTHER PUBLICATIONS

International Search Report in International Application No. PCT/KR2010/008196, filed Nov. 19, 2010.

Office Action dated Feb. 8, 2014, in Chinese Application No. 201080062029.2.

* cited by examiner

APPARATUS FOR DETECTING STEERING TORQUE AND STEERING ANGLE AND STEERING SYSTEM HAVING THE SAME

CROSS-REFERENCE TO RELATED APPLICATIONS

This application is the U.S. national stage application of International Patent Application No. PCT/KR2010/008196, filed Nov. 19, 2010, which claims priority to Korean Application No. 10-2009-0112442, filed Nov. 20, 2009, the disclosures of each of which are incorporated herein by reference in their entirety.

TECHNICAL FIELD

The present invention relates to an apparatus for measuring a steering torque and a steering angle employed in a steering system of a vehicle.

BACKGROUND ART

In general, an automotive power steering system is an assist operating-force providing system configured to smoothly operate a steering handle at the time of great friction resistance applied by a steering wheel leading to a large operating-force for steering a steering handle. Size of the assistant operating-force assisting a steering of the steering handle may be determined by measuring torque applied to a torsion bar when steering a steering handle.

As an apparatus measuring torque of the steering handle, a torque measurement apparatus of several types of methodologies have been developed and used, but a low-priced magnetic field method having a fewer numbers of components is largely employed.

The steering angle measurement apparatus (module) includes a steering angle sensor, and this angle sensor measures a steering degree of the steering handle needed for control of an on-driving vehicle.

Also, the torque measurement apparatus (module) is mounted with a torque sensor, and the torque sensor measures torque applied to a torsion bar to smoothly manipulate a steering handle.

The overlaid angle sensor and torque sensor have separately modularized together with other composite members within an angle torque sensor assembly, that is, configured as an angle sensor module and a torque sensor module.

Conventionally, a torque sensor and an angle sensor for detecting the aforementioned steering torque and steering angle, respectively, are separately installed. Thus, a conventional torque measurement apparatus has a problem in that a component number increases and an installation process is complicated, leading to increase in manufacturing cost. Especially, the angle sensor has disadvantages of high manufacturing cost and cumbersome installation.

DISCLOSURE OF INVENTION

Technical Problem

An object of the present invention is to provide an apparatus for detecting a steering torque and steering angle and a steering system having the same (hereinafter referred to as "steering torque and steering angle measurement apparatus and steering system having the same) such that a steering torque and steering angle measurement function may be configured in one assembly to reduce a component number, simplify a manufacturing process and saving a cost price.

The technical challenge to be achieved by the invention is not limited to the aforementioned, and it would be appreciated by those skilled in the art that other technical challenges can be understood from the following recitation.

Solution to Problem

A steering torque and steering angle measurement apparatus according to one embodiment includes a stator fixed to an output shaft, a magnet disposed at the inner part of the stator and being fixed to an input shaft, a torque sensor measuring a steering torque by sensing a magnetic field produced between the stator and the magnet, and a steering angle signal generation part measuring the steering angle by outputting an ON signal ordinary times and outputting an OFF signal at each preset rotation duration of the output shaft when the output shaft rotates.

The steering angle signal generation part may include a magnet fixed to a printed circuit board to produce a magnet, a hall switch outputting the ON signal ordinary times by being disposed to face the magnet and sensing the magnetic field of the magnet, and a round tooth being fixed to the output shaft for a simultaneous rotation and allowing the hall switch to generate an OFF signal when positioned to face the hall switch.

The magnet may be disposed such that a facet facing the hall switch becomes an N pole or an S pole.

The rotation tooth may be formed to be projected from one side of a fixed member fixed to an output shaft, or formed concavely to a fixed member fixed to an output shaft.

A vehicle steering system includes an input shaft connected to a steering handle, an output shaft connected to a steering wheel and connected to the input shaft by an intermediary of a torsion bar, a magnet disposed at the inner part of the stator and fixed to the input shaft, a torque sensing part measuring a steering torque by sensing a magnetic field produced between the stator and the magnet, and a steering angle signal generation part measuring the steering angle by outputting an ON signal ordinary times and outputting an OFF signal at each preset rotation duration of the output shaft when the output shaft rotates.

Advantageous Effects of Invention

A steering torque and steering angle measurement apparatus according to one embodiment of the present invention has advantageous effects in that a steering angle signal generation part is fixed to the output shaft and measuring the steering angle by outputting an OFF signal at each preset rotation duration of the output shaft while simultaneously rotating when the output shaft circles around such that a steering torque and steering angle measurement function may be configured in one assembly, thereby reducing a component number, simplifying a manufacturing process and saving a cost price.

MODE FOR THE INVENTION

Figure 1:
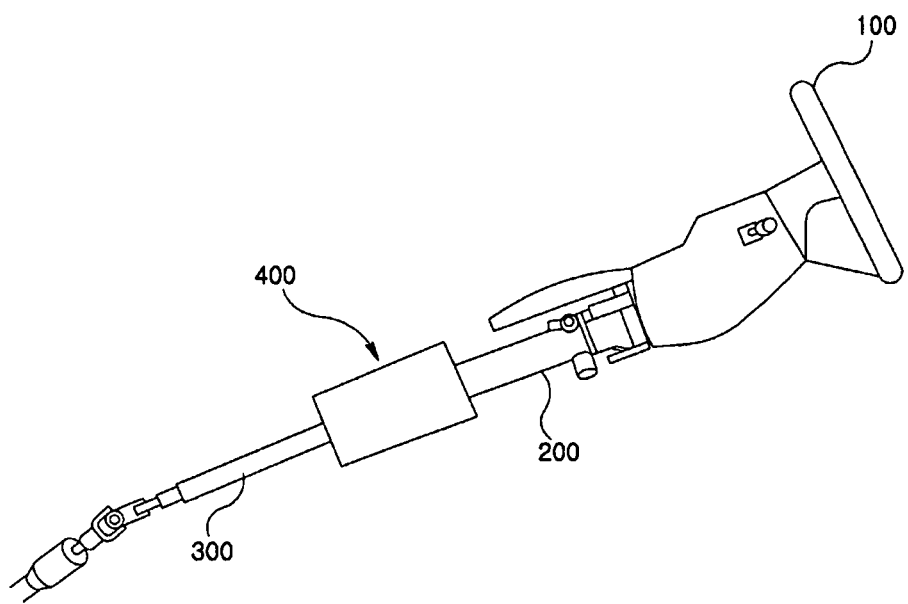
FIG. 1 is a construction diagram of a vehicle-purpose steering system according to one embodiment of the invention.

Hereinafter, a preferred embodiment of the invention will be described in consideration of the annexed drawings. The size and shape of components shown in the drawings during this procedure may be exaggerated or simplified for the sake of description's clarity and conveniences. Also, specially defined terms in consideration of the construction and function of the present invention may be varied according to the intention and custom of users and operators. Such terms-related definition should be made based on recitations throughout the entire specification.

FIG. 1 is a construction diagram of a steering system according to one embodiment of the present invention.

A steering system according to one embodiment of the invention includes a steering handle 100, an input shaft 200 connected to this steering handle 100 for simultaneously rotating when the steering handle 100 circles, an output shaft 300 connected to the input shaft 200 by an intermediary using a torsion bar and connected to a steering wheel, and a steering torque and steering angle measurement apparatus 400 installed between the input shaft 200 and the output shaft 300 to sense a steering torque and a steering angle.

Figure 2:
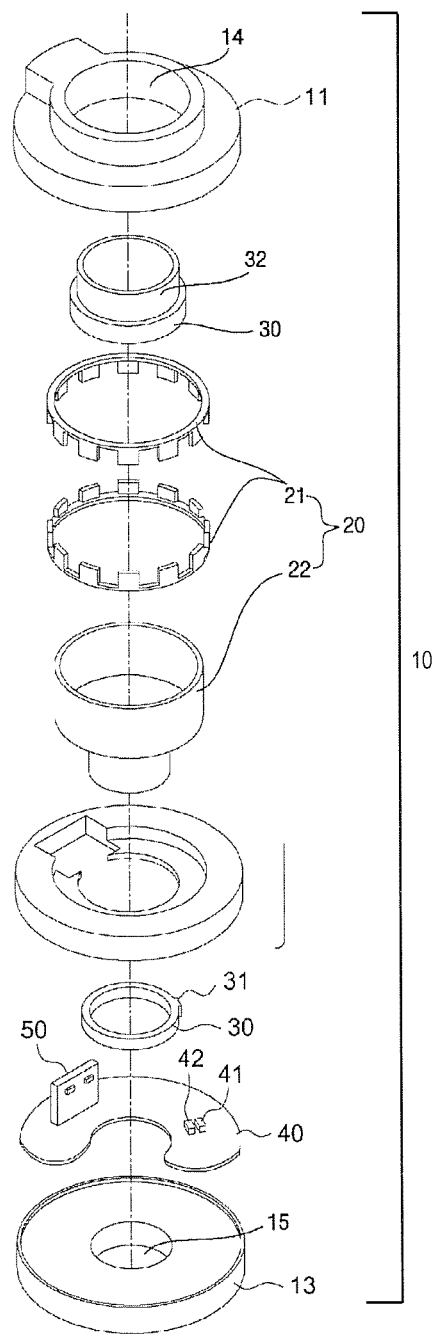
FIG. 2 is an exploded perspective view of a steering torque and steering angle measurement apparatus according to one embodiment of the invention.

FIG. 2 is an exploded perspective view of a steering torque and steering angel measurement apparatus according to one embodiment of the present invention.

As shown in FIG. 2, a steering torque and steering angle measurement apparatus according to one embodiment includes a case 10, a stator 20 disposed inside the case, and a magnet 30 disposed at the inner part of the stator 20.

The case 11, 13 is comprised of a first case 11 and a second case 13 coupled to each other and having a space at their inner part. The first case 11 is formed of a through hole 14 inserting the input shaft 200, and the second case 13 is formed of a through hole 15 inserting the output shaft 300.

The stator 20 includes a stator holder 22 disposed inside the second case 13 and fixed to an output shaft 300, and a plurality of stator teeth 21 coupled to an inner-rim surface of the stator holder 22.

The stator tooth is comprised of one pair respectively coupled at an upper side and lower side of the stator holder 22.

The stator 22 should be formed of nonmagnetic material to prevent the occurrence of a magnetic flux leakage of the stator teeth 21 that concentrates magnetic flux, and should have a preset or more intensity so that the output shaft is inserted therein for fixture.

The magnet 30 may be disposed within the stator holder 22, and disposed at a certain gap from the stator teeth 21 mounted inside the stator holder 22 to face each other, and formed of a ring shape having a plurality of poles such that its polarity may alter with an equal interval in a circumferential direction.

Such a magnet 30 is fixed to the outer-rim surface of the magnet holder 32, and the magnet holder 32 is fixed to the input shaft 200.

Since the input shaft 200 and the output shaft 300 are connected by means of a torsion bar, and the output shaft 300 is connected to a steering wheel contacting a motorway, a rotating angle of the input shaft 200 and the output shaft 300 is different when revolving the steering handle 100 by an external force. Therefore, a rotating angle of the magnet 30 and the stator 20 is also different.

An inner part of the case 10 has a torque sensing part sensing a steering torque. The collector concentrates a magnetic field formed between the stator 20 and the magnet 30, and the torque sensor 50 measures a steering torque by sensing a magnetic field concentrated at the collector.

The torque sensor 50 is fixed to a printed circuit board 40 mounted inside the case 10, so as to be electrically connected to the printed circuit board 40.

The inner part of the case 11, 13 has a steering angle signal generation part outputting an index signal for measuring a steering angle.

Figure 3:
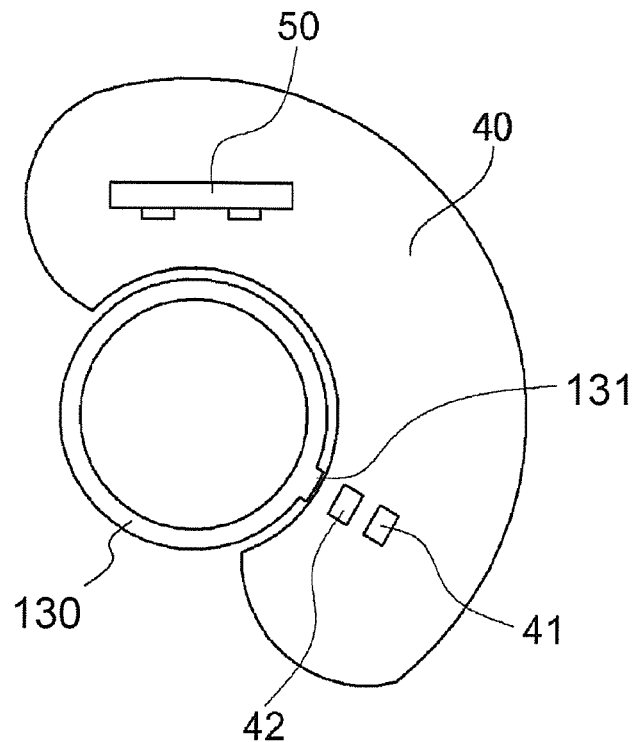
FIG. 3 is a side view of a steering angle signal generation part according to one embodiment of the invention.
Figure 4:
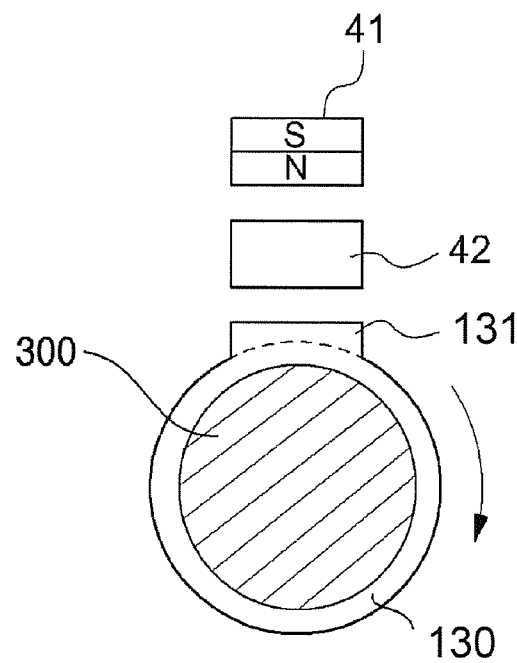
FIG. 4 is a construction diagram of a steering angle signal generation part according to one embodiment of the invention.

The steering angle signal generation part, as shown in FIGS. 3 and 4, includes a magnet 41 fixed to the printed circuit board 40 for producing a magnetic field, a hall switch disposed to face the magnet 41 for sensing a magnetic field of the one or more rotation teeth 131 fixed to the outer-rim surface of the rotating member 130, and a hall switch producing an ON signal when placed to face the magnet 41.

The printed circuit board 40 is formed with a groove of circular shape substantially having one side removed to dispose a rotation tooth 131 in its center, and its overall shape is formed of a shape having one portion in a circular form excluded.

The magnet 41 is fixed to the printed circuit board 40, and disposed such that a facet facing the hall switch 42 becomes an N pole or an S pole.

And, the hall switch 42 is disposed to face the magnet 41, so that it stays at an ON signal ordinary times by sensing a magnetic field of the magnet 41, and when it positions to face a circled rotation tooth 131, outputting an OFF signal.

The outer-rim surface of the output shaft 300 has fixed itself to a rotating member 130 formed of a ring shape, and this rotating member 130 is formed with one or more projected rotation teeth 131.

Figure 5:
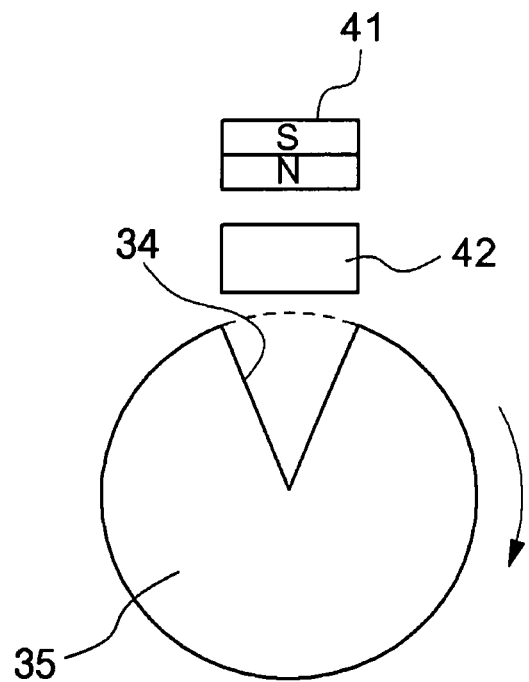
FIG. 5 is a plan view indicating a round tooth of a steering angle signal generation part according to another embodiment of the invention.

And, as another embodiment, as shown in FIG. 5, the round tooth 34 may be formed of a shape concavely inwarded from the outer-rim surface of the rotating member 35. At this time, it is desirable that the round tooth 34 may be formed of a groove with a triangular shape.

Figure 6:
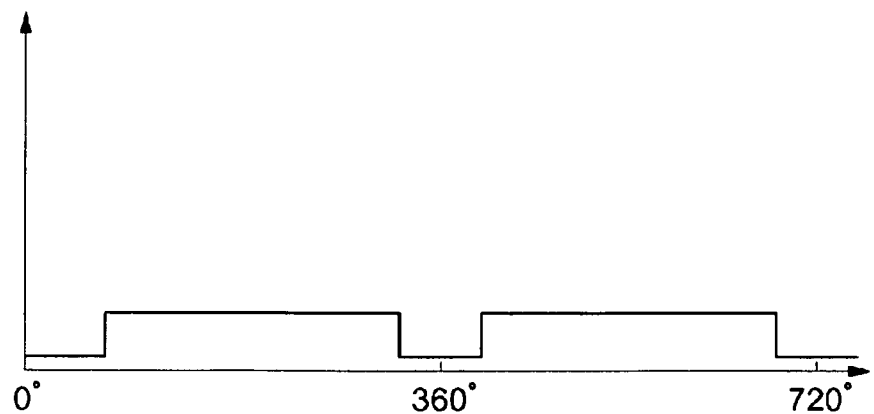
FIG. 6 is a graph indicating an output of a hall switch for a steering angle sensing of a steering angle signal generation part according to one embodiment of the invention.

The hall switch 42 outputs a signal as shown in FIG. 6 by such constructed round tooth (or rotation tooth) and magnet. That is, because the magnet 41 and the hall switch 42 are installed to face each other, the hall switch 42 outputs a continuous ON operation signal (Digit: 1) by the magnetic field of the magnet 41, but when the rotation tooth 131 is rotated and placed to face the hall switch 42, it outputs an OFF operation signal (Digit: 0). Again, when the round tooth (or rotation tooth) becomes far away, it outputs a continuous ON operation signal and repeats this procedure.

Figure 7:
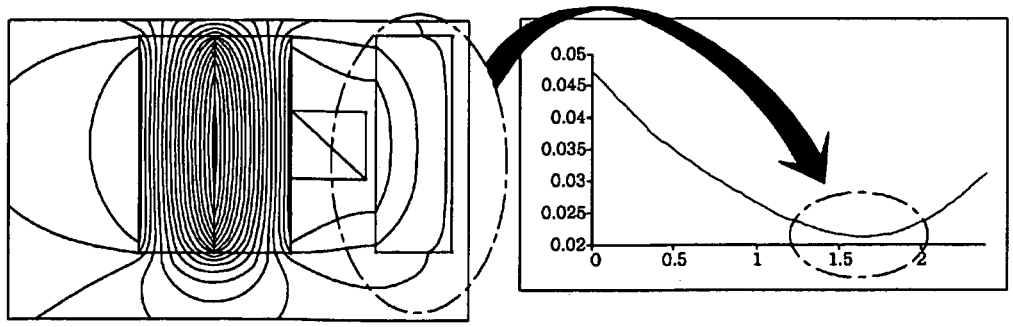
FIG. 7 is a graph indicating a magnetic flux alteration of a magnet according to one embodiment of the invention.

This can be appreciated by referring to a graph illustrated in FIG. 7, that is magnetic flux density gradually decreases by the rotation tooth 131, and when the graph arrives at a position in which a central line of the hall switch 42 and the rotation tooth 131 correctly equals, a lowest point is achieved as indicated in a graph of FIG. 7, recognizing it as a rotation sense signal.

Normally, the torque sensor 50 is outputted as V/Deg [Voltage/Degree] value, and the angle indicates a twisting angle of the torsion bar, and at this time senses a voltage output proportional to the angular amount.

Therefore, by integrating a twisting angle by the operation-force of a driver, a total shifted angular amount can be inferred. At this time, by outputting an index signal value each time of 360° circulation of the output shaft produced from the hall switch 60 in addition to the obtained inferred angle amount as well as outputting an index length signal when the output shaft rotates 360°, it is possible to compute an absolute angle rotating more than 360° in the same direction or can be used in confirming a range of a calculated angle. For example, when an output signal of a hall switch is recorded as number 1, it can be inferred that a corresponding steering angle range resides in 360° through 720°.

While embodiments according to the present invention have been described above, these are only by way of example and it would be understood by those skilled in the art that any embodiment of various modifications and equivalents can be made thereto. Thus, the genuine technical scope of the present invention should be defined from the accompanying claims.

Industrial Applicability

A steering torque and steering angle measurement apparatus according to one embodiment of the present invention has industrial applicability in that a steering angle signal generation part is fixed to the output shaft and measuring the steering angle by outputting an OFF signal at each preset rotation duration of the output shaft while simultaneously rotating when the output shaft circles around such that a steering torque and steering angle measurement function may be configured in one assembly, thereby reducing a component number, simplifying a manufacturing process and saving a cost price.

The invention claimed is:

1. A steering torque and steering angle measurement apparatus, comprising:
a stator configured to be fixed to an output shaft;
a ring magnet disposed at the inner part of the stator and configured to be fixed to an input shaft;
a torque sensor measuring a steering torque by sensing a magnetic field produced between the stator and the ring magnet; and
a steering angle signal generation part measuring the steering angle,
wherein the ring magnet is formed of a ring shape, and disposed such that its polarity alters with an equal interval in a circumferential direction,
wherein the steering angle signal generation part includes:
a steering angle magnet fixed to a printed circuit board (PCB) to produce a magnetic field;
a hall switch outputting an ON signal at ordinary times by being disposed to face the steering angle magnet and sensing the magnetic field of the steering angle magnet; and
a rotating member formed with a rotation tooth, and configured to be fixed at the output shaft to simultaneously rotate with the output shaft,
wherein the rotation tooth faces the steering angle magnet when the rotation tooth is placed in a nearest position to the steering angle magnet,
wherein the rotation tooth is one of an outward projection from the rotating member in a radial direction of the rotating member or an inward indentation of the rotating member in the radial direction of the rotating member,
wherein the PCB has a curved shape and is disposed around the rotating member such that the PCB curves around a portion of a circumference of the rotating member, and wherein the torque sensor is fixed to the PCB.

2. The measurement apparatus of claim 1, wherein the stator includes a stator holder formed of nonmagnetic material, and a plurality of stator teeth coupled to an inner-rim surface of the stator holder.

3. The measurement apparatus of claim 1, wherein the stator includes a collector for concentrating a magnetic field formed between the stator and the ring magnet, and wherein the torque sensor is disposed to face the collector.

4. The measurement apparatus of claim 1, wherein the rotation tooth is an outward projection from the rotating member in the radial direction of the rotating member.

5. The measurement apparatus of claim 1, wherein the steering angle magnet is disposed such that a facet facing the hall switch becomes an N pole or an S pole.

6. The measurement apparatus of claim 1, wherein the rotation tooth is an inward indentation of the rotating member in the radial direction of the rotating member.

7. The measurement apparatus of claim 6, wherein the inward indentation is a groove with a triangular shape.

8. A vehicle-purpose steering system, comprising:
an input shaft connected to a steering handle;
a measurement apparatus connected to the input shaft; and
an output shaft connected to the measurement apparatus,
wherein the measurement apparatus comprises:
a stator configured to be fixed to the output shaft;
a ring magnet disposed at the inner part of the stator and configured to be fixed to the input shaft;
a torque sensor measuring a steering torque by sensing a magnetic field produced between the stator and the ring magnet; and
a steering angle signal generation part measuring the steering angle,
wherein the ring magnet is formed of a ring shape, and disposed such that its polarity alters with an equal interval in a circumferential direction,
wherein the steering angle signal generation part includes:
a steering angle magnet fixed to a printed circuit board (PCB) to produce a magnetic field;
a hall switch outputting an ON signal at ordinary times by being disposed to face the steering angle magnet and sensing the magnetic field of the steering angle magnet; and
a rotating member formed with a rotation tooth, and configured to be fixed at the output shaft to simultaneously rotate with the output shaft,
wherein the rotation tooth is faced to the steering angle magnet when the at least one rotation tooth is placed in a nearest position to the steering angle magnet,
wherein the rotation tooth is one of an outward projection from the rotating member in a radial direction of the rotating member or an inward indentation of the rotating member in the radial direction of the rotating member,
wherein the PCB has a curved shape and is disposed around the rotating member such that the PCB curves around a portion of a circumference of the rotating member, and wherein the torque sensor is fixed to the PCB.

9. The vehicle-purpose steering system of claim 8, wherein the stator includes a stator holder formed of nonmagnetic material, and a plurality of stator teeth coupled to an inner-rim surface of the stator holder.

10. The vehicle-purpose steering system of claim 8, wherein the stator includes a collector for concentrating a magnetic field formed between the stator and the ring magnet, and the torque sensor is disposed to face the collector.

11. The vehicle-purpose steering system of claim 10, wherein the rotation tooth is an outward projection from the rotating member in the radial direction of the rotating member.

12. The vehicle-purpose steering system of claim 8, wherein the steering angle magnet is disposed such that a facet facing the hall switch becomes an N pole or an S pole.

13. The vehicle-purpose steering system of claim 8, wherein the rotation tooth is an inward indentation of the rotating member in the radial direction of the rotating member.

14. The vehicle-purpose steering system of claim 13, wherein the inward indentation is a groove with a triangular shape.

* * * * *